(12) United States Patent
Kim et al.

(10) Patent No.: US 10,606,097 B2
(45) Date of Patent: Mar. 31, 2020

(54) CAMERA MODULE HAVING A BUFFER UNIT

(71) Applicant: LG Innotek Co., Ltd., Seoul (KR)

(72) Inventors: Minsoo Kim, Seoul (KR); Seongcheol Jeong, Seoul (KR); Taemin Ha, Seoul (KR); Seonyoung Kim, Seoul (KR); Junghyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/058,823

(22) Filed: Aug. 8, 2018

(65) Prior Publication Data
US 2018/0348539 A1 Dec. 6, 2018

Related U.S. Application Data

(63) Continuation of application No. 15/391,567, filed on Dec. 27, 2016, now Pat. No. 10,067,356, which is a
(Continued)

(30) Foreign Application Priority Data

Oct. 28, 2011 (KR) .................. 10-2011-0111005
Oct. 31, 2011 (KR) .................. 10-2011-0112294
(Continued)

(51) Int. Cl.
G02B 27/64 (2006.01)
G03B 3/10 (2006.01)
(Continued)

(52) U.S. Cl.
CPC ............. *G02B 27/646* (2013.01); *G03B 3/10* (2013.01); *G03B 5/00* (2013.01); *G03B 13/36* (2013.01);
(Continued)

(58) Field of Classification Search
CPC .. G02B 27/646; H04N 5/2328; H04N 5/2252; H04N 5/23258; H04N 5/2257;
(Continued)

(56) References Cited

U.S. PATENT DOCUMENTS 6,078,751 A 6/2000 Yamazaki et al.
7,881,598 B1 2/2011 Wu et al.
(Continued)

FOREIGN PATENT DOCUMENTS

CN 1912668 A 2/2007
CN 101227815 A 7/2008
(Continued)

*Primary Examiner* — Gevell V Selby
(74) *Attorney, Agent, or Firm* — Birch, Stewart, Kolasch & Birch, LLP

(57) ABSTRACT

A camera module according to an embodiment of the present invention may include a first Printed Circuit Board (PCB) configured to have an image sensor mounted thereon; a housing unit disposed over the first PCB; a holder module spaced apart from a bottom surface within the housing unit at a specific interval and configured to have a first coil wound on its outer circumferential face and to include at least lens therein; a second PCB combined with the bottom surface of the holder module; a third PCB disposed over the holder module; and a plurality of wire springs each configured to have one end connected to the second PCB and the other end connected to the third PCB.

25 Claims, 10 Drawing Sheets

Related U.S. Application Data continuation of application No. 14/737,158, filed on Jun. 11, 2015, now Pat. No. 9,563,067, which is a continuation of application No. 14/335,593, filed on Jul. 18, 2014, now Pat. No. 9,081,205, which is a continuation of application No. 13/549,968, filed on Jul. 16, 2012, now Pat. No. 8,817,116.

(30) Foreign Application Priority Data

| Oct. 31, 2011 | (KR) | ......................... | 10-2011-0112306 |
| Nov. 29, 2011 | (KR) | ......................... | 10-2011-0125616 |
| Feb. 9, 2012 | (KR) | ......................... | 10-2012-0013230 |

(51) Int. Cl.
*G03B 17/02* (2006.01)
*H04N 5/232* (2006.01)
*H04N 5/225* (2006.01)
*G03B 5/00* (2006.01)
*G03B 13/36* (2006.01)

(52) U.S. Cl.
CPC ............ *G03B 17/02* (2013.01); *H04N 5/2252* (2013.01); *H04N 5/2257* (2013.01); *H04N 5/2328* (2013.01); *H04N 5/23258* (2013.01); *H04N 5/23287* (2013.01); *G03B 2205/0015* (2013.01); *G03B 2205/0069* (2013.01)

(58) Field of Classification Search
CPC ...... H04N 5/23287; G03B 17/02; G03B 3/10; G03B 13/36; G03B 5/00; G03B 2205/0069; G03B 2205/001
See application file for complete search history.

(56) References Cited

U.S. PATENT DOCUMENTS

| 9,081,205 | B2 | 7/2015 | Kim et al. |
| 9,563,067 | B2 | 2/2017 | Kim et al. |
| 10,067,356 | B2 * | 9/2018 | Kim ........................ G03B 5/00 |
| 2003/0234990 | A1 | 12/2003 | Akanuma |
| 2007/0035860 | A1 | 2/2007 | Adachi et al. |
| 2008/0117536 | A1 | 5/2008 | Higuchi |
| 2008/0169437 | A1 | 7/2008 | Chang |
| 2009/0002825 | A1 | 1/2009 | Morita et al. |
| 2009/0086033 | A1 | 4/2009 | Watanabe et al. |
| 2009/0160959 | A1 | 6/2009 | Watanabe et al. |
| 2009/0185300 | A1 | 7/2009 | Iida |
| 2009/0199987 | A1 | 8/2009 | Spindler et al. |
| 2009/0252488 | A1 | 10/2009 | Eromaki et al. |
| 2010/0290769 | A1 | 11/2010 | Nasiri et al. |
| 2010/0315520 | A1 | 12/2010 | Noto et al. |
| 2011/0096178 | A1 | 4/2011 | Ryu et al. |
| 2012/0154614 | A1 | 6/2012 | Moriya et al. |
| 2013/0107112 | A1 | 5/2013 | Oh |

FOREIGN PATENT DOCUMENTS

| CN | 101990755 A | 3/2011 |
| DE | 10 2006 037 219 A1 | 2/2007 |
| EP | 2141915 A2 | 1/2010 |
| JP | 10-39351 A | 2/1998 |
| JP | 2011-65140 A | 3/2011 |
| JP | 2011-85666 A | 4/2011 |
| JP | 2011-521285 A | 7/2011 |
| KR | 10-2009-0117613 A | 11/2009 |
| KR | 10-0952620 B1 | 4/2010 |
| KR | 10-2010-0093263 A | 8/2010 |
| KR | 10-0980044 B1 | 9/2010 |
| KR | 10-1005776 B1 | 1/2011 |
| KR | 10-1245146 B1 | 3/2013 |
| TW | 201100901 A1 | 1/2011 |
| WO | WO 2009/139543 A1 | 11/2009 |
| WO | WO 2011/062123 A1 | 5/2011 |
| WO | WO 2013/027927 A2 | 2/2013 |
| WO | WO 2013/042865 A1 | 3/2013 |

* cited by examiner

CAMERA MODULE HAVING A BUFFER UNIT

CROSS-REFERENCE TO RELATED APPLICATION

This application is a continuation of co-pending application Ser. No. 15/391,567, filed Dec. 27, 2016, which is a continuation of application Ser. No. 14/737,158, filed on Jun. 11, 2015 (now U.S. Pat. No. 9,563,067, issued on Feb. 7, 2017), which is a continuation of application Ser. No. 14/335,593, filed on Jul. 18, 2014 (now U.S. Pat. No. 9,081,205, issued on Jul. 14, 2015), which is a continuation of application Ser. No. 13/549,968, filed on Jul. 16, 2012 (now U.S. Pat. No. 8,817,116, issued on Aug. 26, 2014), which claims priority to Korean Application No. 10-2011-0111005, filed on Oct. 28, 2011, Korean Application No. 10-2011-0112294, filed on Oct. 31, 2011, Korean Application No. 10-2011-0112306, filed on Oct. 31, 2011, Korean Application No. 10-2011-0125616, filed on Nov. 29, 2011 and Korean Application No. 10-2012-0013230, filed on Feb. 9, 2012, the disclosures of which are expressly incorporated by reference herein in their entireties.

BACKGROUND OF THE INVENTION

Field of the Invention

The present invention relates to a camera module.

Background of the Related Art

A camera module mounted on a small-sized electronic product may be frequently subject to a shock while in use. The camera module may be minutely shaken by a user's hand shaking during photographing. In view of the above problems, there is recently being disclosed a camera module having hand-shaking prevention means.

For example, Korean Registration Patent No. 10-0741823 (registered on Jul. 16, 2007) discloses a method of installing a gyro sensor IC or an angular velocity sensor within a device on which a camera module is mounted, such as a mobile phone in order to correct a hand shaking phenomenon.

If an additional angular velocity sensor is provided as described above, an additional sensor must be provided in order to implement the hand-shaking prevention function. Accordingly, there are problems in that manufacture costs are increased and an additional space where a hand-shaking prevention device will be constructed and installed must be provided in addition to the camera module.

SUMMARY OF THE INVENTION

It is an object of the present invention to provide a camera module having an optical image stabilizer function.

A camera module according to an embodiment of the present invention may include a first Printed Circuit Board (PCB) configured to have an image sensor mounted thereon; a housing unit disposed over the first PCB; a holder module spaced apart from a bottom surface within the housing unit at a specific interval and configured to have a first coil wound on its outer circumferential face and to include at least lens therein; a second PCB combined with the bottom surface of the holder module; a third PCB disposed over the holder module; and a plurality of wire springs each configured to have one end connected to the second PCB and the other end connected to the third PCB.

The buffering portion may be formed by curving the wire spring in zigzags or may be formed by bending the wire spring in a coil spring form.

It is preferred that the housing unit include a first housing disposed on the upper side of the first PCB; a second housing disposed on the upper side of the first housing and configured to have the third PCB disposed thereon; first and second permanent magnets interposed between the first and the second housings; and yokes each disposed between the first and the second permanent magnets and configured to transfer magnetic force to the holder module.

The housing unit may include a first housing disposed on the upper side of the first PCB; a second housing disposed on the upper side of the first housing and configured to have the third PCB disposed thereon; first and second permanent magnets placed on the insides of the first and the second housings; and yokes each disposed between the first and the second permanent magnets and configured to transfer magnetic force to the holder module.

In accordance to an exemplary embodiment of the present invention, the camera module may further include a shield can formed to have a through hole at the connection unit of the third PCB and the wire spring and at a position corresponding to a lens module.

It is preferred that the holder module include an outer blade formed to have the first coil wound on its outer circumferential face; a bobbin elastically supported by an elastic member on the upper side of the outer blade, disposed movably up and down within the outer blade, and configured to have a second coil wound on its outer circumferential face and to have at least one lens installed therein; and upper and lower elastic members disposed on the respective upper and lower sides of the bobbin and configured to elastically support the bobbin against the outer blade, wherein a space unit is formed at the center of the first coil so that magnetic force is applied toward the second coil.

Furthermore, the central part of the yoke toward the holder module may be protruded.

It is preferred that the holder module include an outer blade formed to have the first coil wound on its outer circumferential face; a bobbin elastically supported by an elastic member on the upper side of the outer blade, disposed movably up and down within the outer blade, and configured to have a second coil wound on its outer circumferential face and to have at least one lens installed therein; and upper and lower elastic members disposed on the respective upper and lower sides of the bobbin and configured to elastically support the bobbin against the outer blade.

The second PCB may be installed at the bottom surface of the outer blade.

It is preferred that the second PCB be fixed to the bottom surface of the outer blade by an adhesive member.

The wire springs may be made of metal material, and the wire springs conduct electricity to the second and the third PCBs.

Furthermore, it is preferred that the number of wire springs be at least 6 so that a power source of two polarities for auto-focusing control and a power source of four polarities for optical image stabilizer are supplied to the holder module through connection between the wire springs and the second and the third PCBs.

Furthermore, it is preferred that four pairs of the wire springs having an identical length be disposed at respective corners of the holder module.

Here, it is preferred that the second coil be electrically connected to a lower spring, and the lower spring be electrically connected to the wire spring in the second PCB.

Furthermore, the second coil may be directly connected to the second PCB so that the second coil conducts electricity to the second PCB.

Furthermore, a space unit may be formed at a center of the first coil so that magnetic force is applied toward the second coil.

In accordance with the present invention, the wire springs can be firmly connected to the connection units of the PCBs because the buffering portions for absorbing load repeatedly applied to the wire springs are provided.

Furthermore, although excessive force is applied to the wire springs in a process of assembling the lens module, the buffering portions can absorb the excessive force. Accordingly, an assembly property can be improved, and the loss of parts due to poor assembly can be minimized.

BRIEF DESCRIPTION OF THE DRAWINGS

Further objects and advantages of the invention can be more fully understood from the following detailed description taken in conjunction with the accompanying drawings in which.

DETAILED DESCRIPTION OF EMBODIMENTS

Hereinafter, some exemplary embodiments of the present invention are described in detail with reference to the accompanying drawings.

Figure 1:
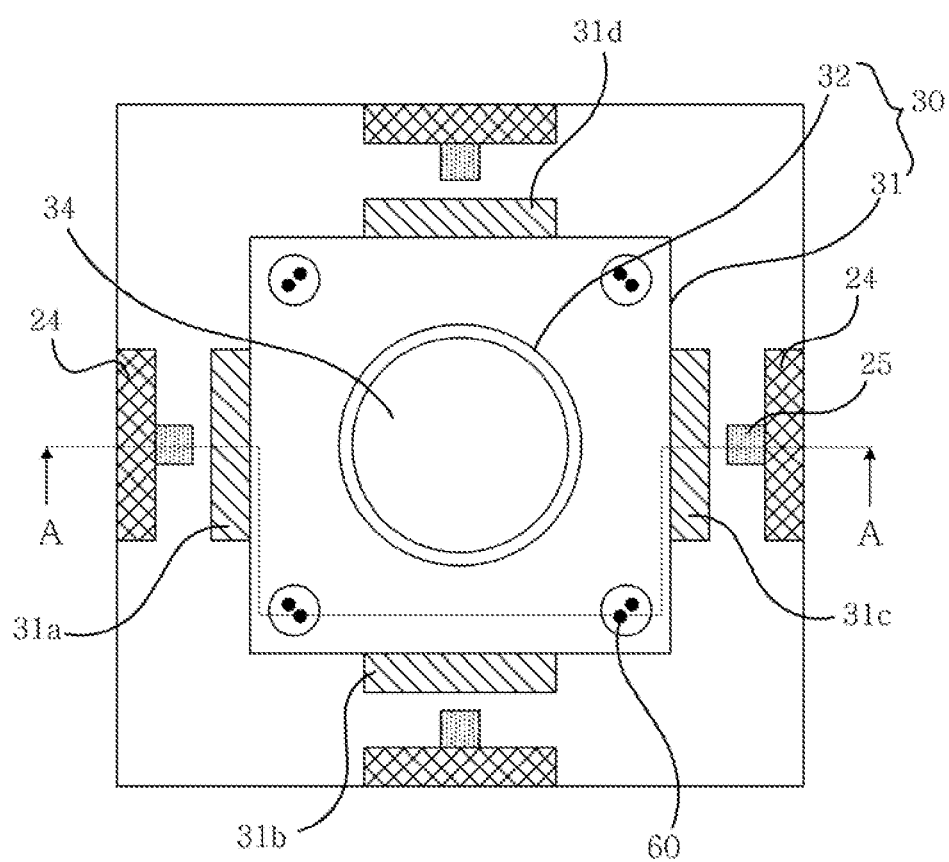
FIG. 1 is a schematic plan view of a camera module according to an embodiment of the present invention.
Figure 2:
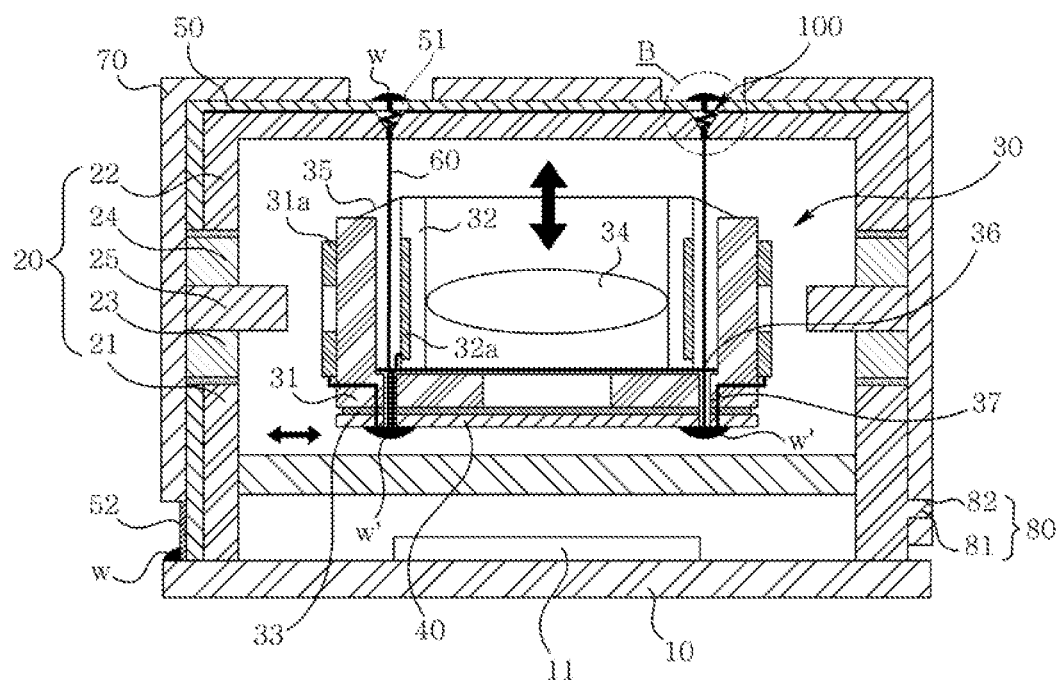
FIG. 2 is a sectional view of the camera module taken along line A-A of FIG. 1 according to first and second embodiments of the present invention.
Figure 3:
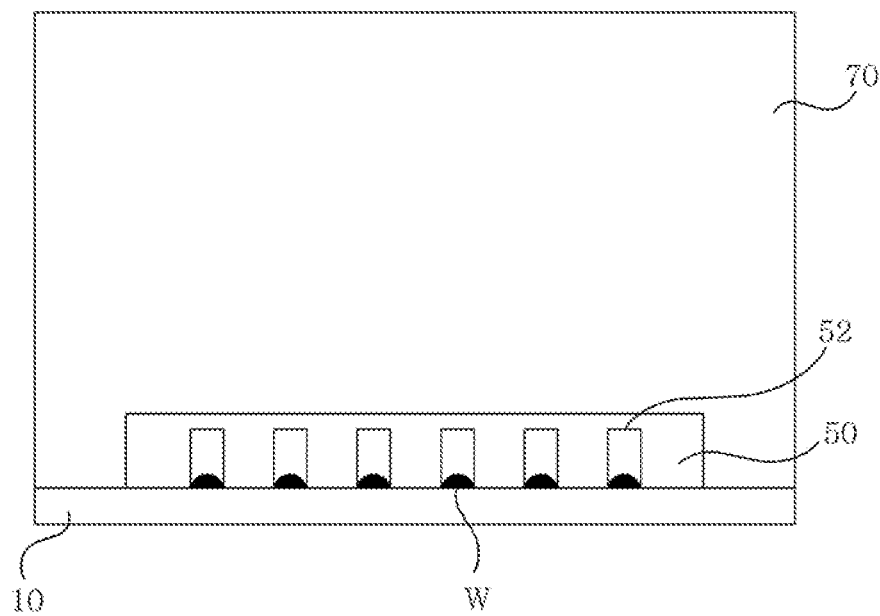
FIG. 3 is a side view of the camera module according to an embodiment of the present invention.
Figure 4:
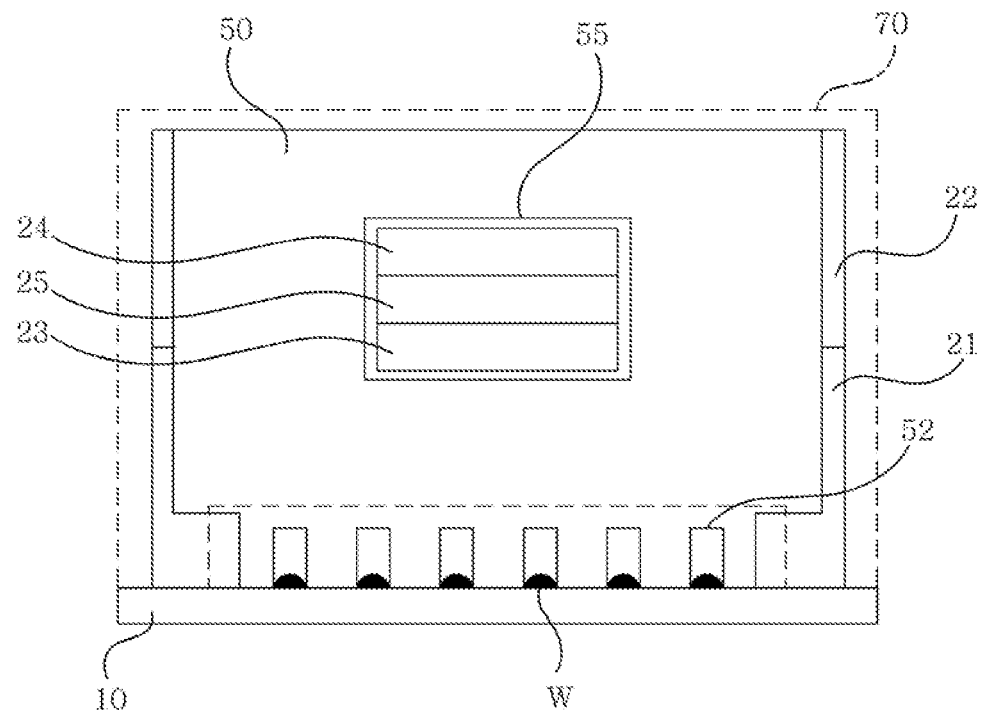
FIG. 4 is a side view of the camera module from which a shield can of FIG. 3 has been removed.
Figure 5:
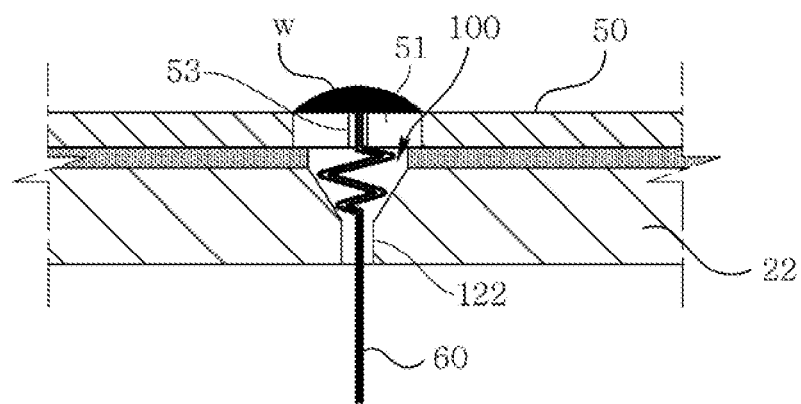
FIG. 5 is an enlarged view of a part B of FIG. 2 according to the first embodiment of the present invention.
Figure 6:
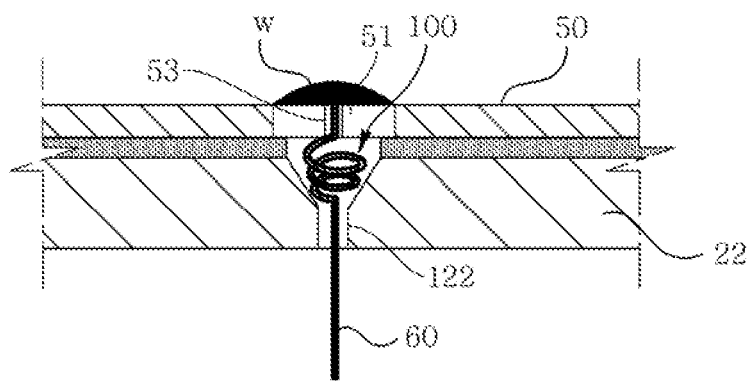
FIG. 6 is an enlarged view of the part B of FIG. 2 according to the second embodiment of the present invention.

FIG. 1 is a schematic plan view of a camera module according to an embodiment of the present invention, FIG. 2 is a sectional view of the camera module taken along line A-A of FIG. 1 according to first and second embodiments of the present invention, FIG. 3 is a side view of the camera module according to an embodiment of the present invention;

FIG. 4 is a side view of the camera module from which a shield can of FIG. 3 has been removed, FIG. 5 is an enlarged view of a part B of FIG. 2 according to a first embodiment of the present invention, and FIG. 6 is an enlarged view of a part B of FIG. 2 according to a second embodiment of the present invention.

As shown in FIG. 1 showing the schematic plan view and FIG. 2 showing the schematic side view of line A-A in FIG. 1, the camera module according to the present invention includes a first Printed Circuit Board (hereinafter referred to as a PCB) 10, a housing unit 20, a holder module 30, a second PCB 40, a third PCB 50, wire springs 60, and buffering portions 100.

It is preferred that an image sensor 11 be mounted approximately on the central part of the first PCB 10. Elements for driving the image sensor 11 may be disposed in the first PCB 10 or a plurality of terminal units for supplying power and outputting information from the image sensor 11 may be provided in the first PCB 10.

The housing unit 20 is disposed over the first PCB 10, and it forms the framework of the camera module. In accordance with an exemplary embodiment of the present invention, the housing unit 20 includes a first housing 21, a second housing 22, pairs of first and second permanent magnets 23 and 24, and a plurality of yokes 25.

The first housing 21 is a base and is disposed on the top of the first PCB 10 and spaced apart from the image sensor 11 at a specific interval. A filter member for filtering an image phase incident on the image sensor 11 may be further included in the first housing 21 as occasion demands.

The second housing 22 is disposed on the top of the first housing 21 and is configured to cover the first housing 21. An opening is formed approximately at the center of the second housing 22 so that an image can be transferred to the image sensor 11. The third PCB 50 is adhered and fixed to the upper lateral face of the second housing 22 using a fixing member to be described later, such as a double-sided tape or an adhesive, but not limited thereto. In some embodiments, however, an additional third housing, such as a casing or a shield can, may be provided, and the third PCB 50 may be fixed to the inside of the additional third housing using the fixing member according to a product design. If the third housing is provided, the third housing may press and support the third PCB 50 without an additional fixing member.

The first and the second permanent magnets 23 and 24 are interposed between the first and the second housings 21 and 22 and are configured to apply magnetic force to the holder module 30. It is preferred that the first and the second permanent magnets 23 and 24 have the same size. Furthermore, the first and the second permanent magnets 23 and 24 and the yoke 25 may be disposed on the inside of the first and the second housing 21 and 22, if possible, within a design tolerance limit.

Meanwhile, if the size of the first and the second permanent magnets 23 and 24 is increased, Optical Image Stabilization (OIS) driving is increased even by low current. If the first and the second permanent magnets 23 and 24 are configured to have a specific size, OIS driving is increased as current flowing into first and the second coils 31a to 31d and 32a disposed at positions corresponding to the first and the second permanent magnets 23 and 24 is increased. Accordingly, OIS driving becomes better according to an increase of the first and the second permanent magnets 23 and 24, but it is preferred that the first and the second permanent magnets 23 and 24 have an optimized size within a design tolerance limit.

Each of the yokes 25 is interposed between each of the pairs of first and the second permanent magnets 23 and 24. Furthermore, the central portion of the yoke 25 is configured to have a protruded shape so that the pair of first and second permanent magnets 23 and 24 may apply magnetic force to the internal space of the holder module 30. It is preferred that the yoke 25 be configured to the same width as the pair of first and second permanent magnets 23 and 24, the center of the yoke 25 be protruded in a specific size, and the pair of first and second permanent magnets 23 and 24 and the yoke 25 have an approximately 'T' shape.

The holder module 30 is spaced apart from the bottom surface of the inside of the housing unit 20 and is formed of an outer blade 31 and a bobbin 32. The holder module 30 may perform a pendulum movement in the front/rear, left/right, and diagonal directions with it dangled from the wire springs 60.

Spring members 35 and 36 are provided in the upper and lower parts of the outer blade 31, respectively. The outer blade 31 is elastically supported by the spring member 35 so that the bobbin 32 is moved up and down.

As shown in FIG. 1, a total of four first coils 31a to 31d are wound on the four outer faces of the outer blade 31, respectively, and the central part of each of the four outer faces of the outer blade 31 on which the first coils 31a to 31d are wound is perforated without a coil. Each of the yokes 25 is disposed at a position corresponding to the perforated space unit, and thus the yoke 25 may be partially inserted into the space unit.

The second PCB 40 may be fixed to the bottom of the outer blade 31 using a fixing member 33, such as a double-sided tape or an adhesive. The outer blade 31 is dangled from the plurality of wire springs 60 so that the outer blade 31 can move in the front/rear and left/right directions or in a diagonal line according to an interaction between the magnetic force of the first and the second permanent magnets 22 and 23 and the first coils 31a, as indicated by an arrow of FIG. 2. Furthermore, the outer blade 31 is spaced apart from the bottom surface of the first housing 21 at a specific interval.

Furthermore, a plurality of spring through holes 37 may be provided in the outer blade 31 so that the wire springs 60 are connected to the second PCB 40 through the spring through holes 37.

The bobbin 32 is disposed within the outer blade 31 so that it is movable up and down. At least one lens 34 is installed within the bobbin 32. The second coil 32a is wound on the outer circumferential face of the bobbin 32. The second coil 32a performs an operation of raising up and lowering the bobbin 32 through an interaction with the magnetic force applied through the perforated spaces without the first coils 31a to 31d of the outer blade 31 through the yokes 25. As the size of the yoke 25 increases, AF driving may become better, but may be changed according to an optimal design value. It is possible to automatically control the focus of an image transferred to the image sensor 11 through the raising action of the bobbin 32.

The second PCB 40 is disposed at the bottom surface of the outer blade 31 as described above and is connected to the wire springs 60 so that it can supply a power source to the first and the second coils 31a to 31d and 32a. This connection method may include any method if soldering or other conductive substances may be used. That is, the connection units w' of the second PCB 40 are connected to the first coils 31a to 31d, respectively, and the second coil 32a, as shown in, FIG. 2. Thus, a power source supplied through the wire springs 60 is transferred to the first and the second coils 31a to 31d and 32a, thus forming electromagnetic force.

Here, the second coil 32a may be directly connected to the second PCB 40, or the second coil 32a may be connected to the lower spring 36 and the lower spring 36 may be then connected to the second PCB 40 as shown in FIG. 2.

The third PCB 50 is fixed to the top of the second housing 22 using the fixing member, such as a double-sided tape or an adhesive member, as described above. A power source transferred through the terminal unit 52 of the third PCB 50 connected to the first PCB 10 is transferred to the second PCB 40 through the wire springs 60 connected to the second PCB 40. This connection method may include any method if soldering or other conductive substances may be used.

The third PCB 50 may be provided to cover the walls of the first and the second housings 21 and 22 on one side, as shown in FIGS. 3 and 4. Here, a window 55 may be formed in a surface of the third PCB 50 where the third PCB 50 faces the first and the second permanent magnets 23 and 24 and the yoke 25 in order to avoid interference therebetween.

The window 55 functions to prevent the third PCB 50 from being influenced by coupling portions because the first and the second permanent magnets 23 and 24 and the yoke 25 are directly adhered to a shield can 70 (described later) by using the fixing means, such as epoxy.

Meanwhile, a flexible PCB (FPCB), a PCB, or a rigid FPCB integration type (R-FPCB) may be used as each of the second PCB 40 and the third PCB 50, but not limited thereto. Any board may be used as the second PCB 40 and the third PCB 50 if the board enables electrical connection.

Each of the wire springs 60 has both ends connected to the second and the third PCBs 40 and 50. Here, one end of the wire spring 60 is connected to a pad 51 formed in the third PCB 50 as shown in FIG. 5. A through hole 53 through which the wire spring 60 passes is formed at the center of the pad 51. In this case, a connection method may include any method if soldering or other conductive substances may be used. Meanwhile, a Solder Register (SR) is provided around the pad 51, thus protecting a surface of the third PCB 50. The area of the pad 51 may be connected by opening the SR so that the area is conductive.

The wire spring 60 connected at the pad 51 as described above supplies the power source from the terminal unit 52 to the second PCB 40, so that the first and the second coils 31a to 31d and 32a may interact with the first and the second permanent magnets 23 and 24.

Furthermore, the other end of the wire spring 60 is connected to the second PCB 40, provided at the bottom surface of the outer blade 31, through the spring through hole 37 formed in the outer blade 31, as shown in FIG. 2. As in the third PCB 50, the other end of the wire spring 60 is connected at a pad (not shown) formed in the second PCB 40, although (not shown). A through hole (not shown) through which the wire spring 60 passes is formed at the center of the pad (not shown). In this case, a connection method may include any method if soldering or other conductive substances may be used. In this construction, the outer blade 31 may be dangled from the wire springs 60 and may be spaced apart from the bottom surface of the first housing 21. In this case, the outer blade 31 performs a pendulum movement according to an interaction between the first coils 31a to 31d and the first and the second permanent magnets 23 and 24. Accordingly, the vibration of the outer blade 31 due to hand shaking can be corrected by the interaction between the first coils 31a to 31d and the first and the second permanent magnets 23 and 24. To this end, it is preferred that the wire spring 60 be made of metal material that has elasticity enough to withstand a shock and conductivity.

Meanwhile, as the thickness of the wire spring 60 is reduced, optical image stabilizer motility becomes better even at a low current, but may be changed according to an optimal design value. It is preferred that the thickness of the wire spring 60 be several μm to several hundreds of μm, more preferably, 1 to 100 μm.

Furthermore, it is preferred that the number of wire springs 60 be at least six. It is necessary to supply a power source of two polarities for auto-focusing control and a power source of four polarities for optical image stabilizer to the holder module 30 through connection between the wire springs 60 and the second and the third PCBs 40 and 50.

In accordance with an exemplary embodiment of the present invention, it is preferred that four pairs of the wire springs 60 having the same length are disposed at the respective corners of the holder module 30 in order to keep the balance, as shown in FIGS. 1 and 2.

Meanwhile, if a third housing, such as the shield can 70, is further included as shown in FIG. 2, the windows 55 for covering the walls of the first and the second housings 21 and 22 are formed in the third PCB 50 in order to avoid the coupling parts because the first and the second permanent magnets 23 and 24 and the yokes 25 are fixed to the shield can 70 using epoxy, as described above.

If the shield can 70 is omitted, the first and the second permanent magnets 23 and 24 and the yokes 25 may be attached and fixed within the third PCB 50. In some embodiments, the windows 55 may be formed in the third PCB 50 as described above, and the first and the second permanent magnets 23 and 24 and the yokes 25 may be inserted into the windows 55. Reinforcement may be additionally performed outside the third PCB 50 using a shielding tape.

It is preferred that the buffering portions 100 be integrally formed with some sections of each of the wire springs 60. The buffering portion 100 may be formed by bending the wire spring 60 in zigzags as shown in FIG. 5 or may be formed by bending the wire spring 60 in the form of a coil spring as shown in FIG. 6.

Here, the shape of the second housing 22 may be designed so that the buffering portion 100 is placed at a position where the wire spring 60 does not interfere with the second housing 22.

The buffering portion 100 has a downward tapered structure. It is preferred that the buffering portion 100 have a conical funnel shape that is downwardly tapered, as shown in FIGS. 5 and 6. The support hole 122 is formed in the same axis as the through hole 53. It is preferred that the support hole 122 have a diameter equal to or greater than the through hole 53.

The through hole 53 may have a diameter slightly greater than the wire spring 60. The diameter of the through hole 53 may be designed such that a connection substance, such as soldering, or another conductive substance, flows out through the through hole 53 when the wire spring 60 is connected at the pad 51 formed in the third PCB 50 and then the connection substance is connected to the wire spring 60 on both the top and bottom surfaces of the third PCB 50.

The diameter of the support hole 122 may be slightly greater than the diameter of the wire spring 60. Alternatively, the diameter of the support hole 122 may be equal to or greater than the diameter of the through hole 53. That is, the diameter of the support hole 122 may be designed in order to prevent interference occurring because the wire spring 60 comes in contact with the second holder 22 near the support hole 2.

The buffering portion 100 constructed as described above functions to absorb load applied to the wire spring 60. Accordingly, load applied to the pad 51 provided in the third PCB 50 can be reduced, thereby being capable of reducing load directly applied to a connection unit w that fixes the wire spring 60.

Meanwhile, in a common assembly process, after the bobbin 32 and the outer blade 31 are combined, the second housing 22, the second and the third PCBs 40 and 50, and the wire springs 60 are coupled, the bobbin 32 including a lens barrel is combined, the first housing 21 is connected, and the first housing 21 is then mounted on the first PCB 10 by using a jig. Alternatively, the permanent magnets and the yokes may be combined before the first housing 21 is connected. The sequence of the above assembly may be changed as occasion demands. In other words, the assembly may be directly performed in equipment without a jig. In this process, although force for inserting and combining the bobbin 32 including the lens barrel is excessively great and the connection units w are adversely affected by the excessive force, the buffering portions 100 may absorb the excessive force.

In other words, the buffering portion 100 absorbs load, generated in the wire spring 60 around the connection unit w of the wire spring 60 and the third PCB 50 and then pulled in the direction of gravity, and load generated when the wire spring 60 is shaken left and right in the form of transformation energy, as shown in FIGS. 2, 5, and 6.

It is thus possible to prevent a problem that a connection work must be performed again or a problem that a damaged product may not be used due to the connection unit w broken during an assembly process. Accordingly, a more reliable camera module may be fabricated.

Figure 7:
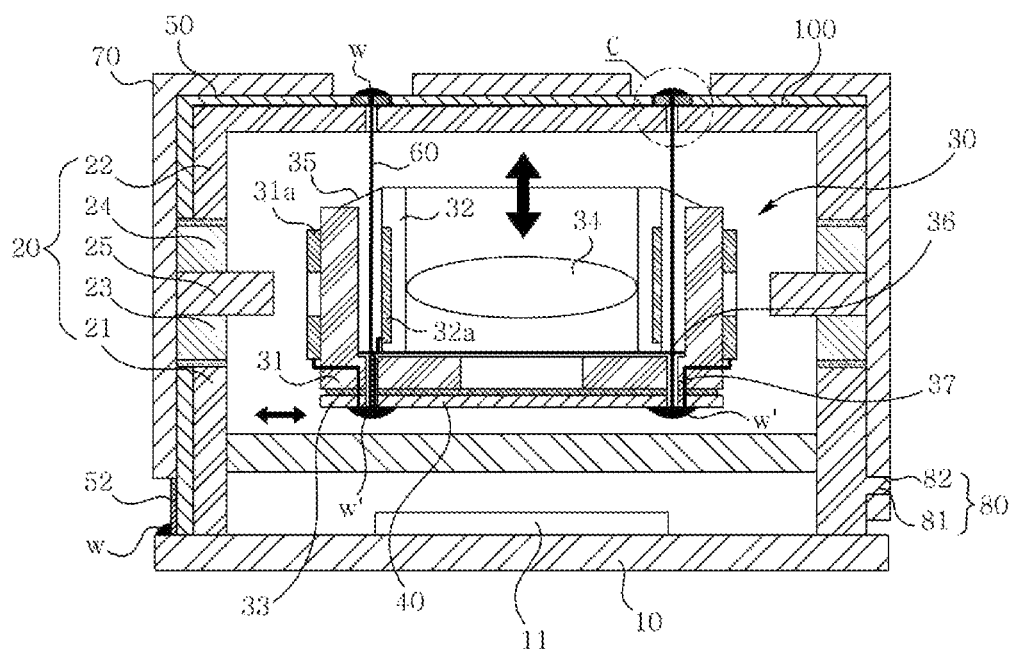
FIG. 7 is a schematic sectional view of the camera module taken along line A-A of FIG. 1 according to a third embodiment of the present invention.
Figure 8:
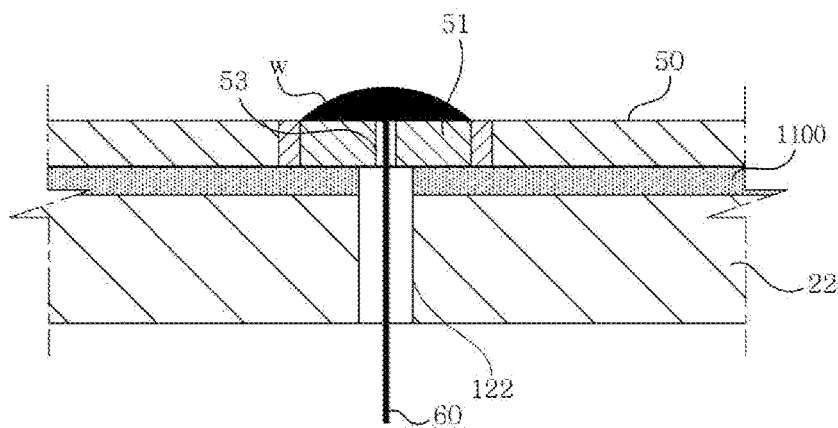
FIG. 8 is an enlarged view of a part C of FIG. 7 according to the third embodiment of the present invention.

In accordance with a second exemplary embodiment of the present invention, the camera unit may further include a buffer member 1100 instead of the buffering portions 100 used in the first and second embodiments, as shown in FIGS. 7 and 8.

The buffer member 1100 is interposed between the second housing 22 and the third PCB 50 as shown in FIG. 7. The buffer member 1100 functions to distribute load applied to the connection units w by absorbing force generated in the pads 51 or the wire springs 60 provided in the third PCB 50 in order to couple the wire springs 60 and the third PCB 50.

The through hole 53 may have a diameter slightly greater than the wire spring 60. The diameter of the through hole 53 may be designed such that a connection substance, such as soldering, or another conductive substance, flows out through the through hole 53 when the wire spring 60 is connected at the pad 51 formed in the third PCB 50 and then the connection substance is connected to the wire spring 60 on both the top and bottom surfaces of the third PCB 50.

The diameter of the support hole 122 may be slightly greater than the diameter of the wire spring 60. That is, the diameter of the support hole 122 may be designed to be greater than the diameter of the through hole 53 in order to prevent interference occurring because the wire spring 60 comes in contact with the second holder 22 near the support hole 2.

In accordance with a third exemplary embodiment of the present invention, it is preferred that the buffer member 1100 be disposed on the entire surface that faces the third PCB 50 over the second housing 22. Although not shown, the buffer members 1100 may be disposed only near the connection units w.

The buffer member 1100 may be formed of an impact-resistant member, such as microcellular polyurethane foam. For example, PORON may be used as the microcellular polyurethane foam, but not limited thereto. Any material that may be elastically deformed by external force may be used as the buffer member 1100.

The buffer member 1100 may be spaced apart from the ends of the pad 51 and the through hole 53 at a specific interval in order to prevent the third PCB 50 from being torn. As shown in FIG. 5, the buffer member 1100 may be disposed between the end of the through hole 53 and the end of the pad 51 and configured to fix the third PCB 50 and the second housing 22 and to reduce load directly added to the connection unit w that fixes the wire spring 60.

Furthermore, the buffer member 1100 may be disposed between the third PCB 50 and the second housing 22 at the end of the support hole 122 or at a position (not shown) spaced apart from the end of the support hole 122 at a specific interval in order to absorb shock.

That is, as shown in FIGS. 7 and 8, the buffer member 1100 is disposed so that it comes into a surface contact with the pad 51. Accordingly, load generated in the wire spring 60 and then pulled in the direction of gravity or load generated when the wire spring 60 is shaken left and right is primarily applied to the pad 51. The force applied to the pad 51 is transferred to the buffer member 1100. Thus, the buffer member 1100 absorbs the load energy in the form of transformation energy by elastically transforming the force.

It is thus possible to prevent a problem that a connection work must be performed again or a problem that a damaged product may not be used due to the connection unit w broken during an assembly process.

In accordance with fourth to sixth embodiments of the present invention, buffering portions 2100 may be formed in respective wire springs 60.

Figure 9:
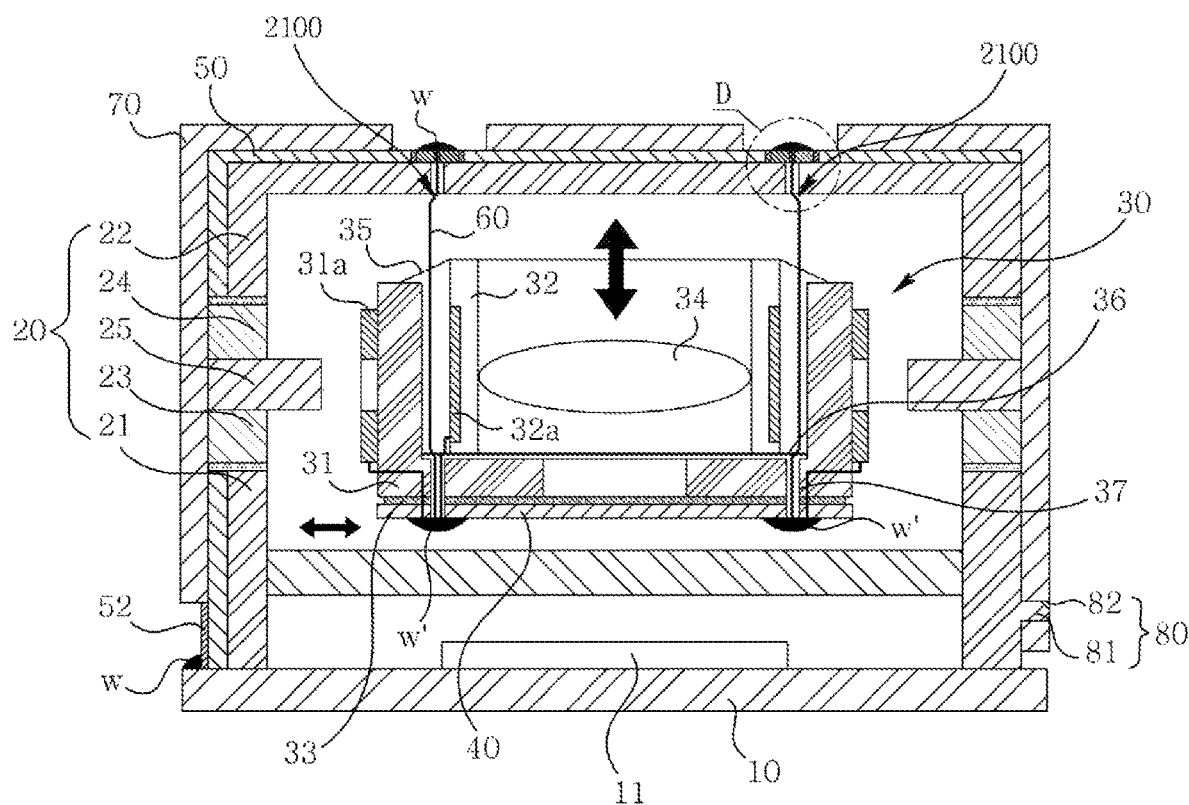
FIG. 9 is a schematic sectional view of the camera module taken along line A-A of FIG. 1 according to a fourth embodiment of the present invention.
Figure 10:
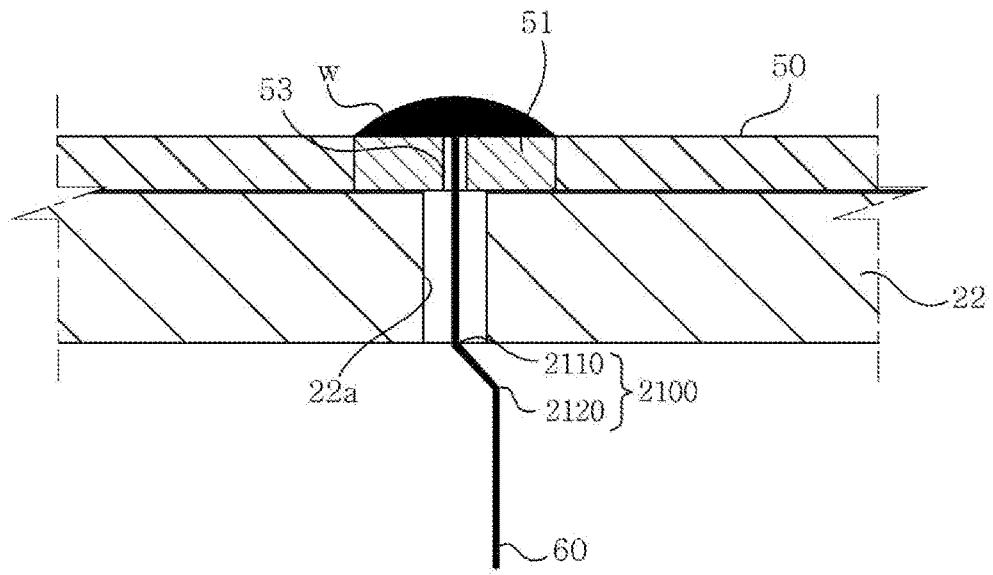
FIG. 10 is an enlarged view of a part D of FIG. 9 according to the fourth embodiment of the present invention.

It is preferred that the buffering portions 2100 be integrally formed with some region of each of the wire springs 60. In accordance with a fourth exemplary embodiment of the present invention, it is preferred that the buffering portions 2100 be formed near the connection unit w of the wire spring 60 and the third PCB 50 and a connection unit w' of the wire springs 60 and the second PCB 40, as shown in FIGS. 9 and 10.

It is preferred that each of the buffering portions 2100 include first and second curved parts 2110 and 2120 at a position not interfering with the second housing 22 of the wire spring 60, but not limited thereto. For example, the buffering portion 2100 may be curved twice or more at need in order to absorb load applied to the wire spring 60 at the curved points.

That is, as shown in FIG. 3, the first and the second curved parts 2110 and 2120 may become the center of the moment of the curved wire spring 60 depending on load applied to the wire spring 60 so that they are deformed in a straight-line direction to the curved wire spring 60. Accordingly, deformation around each of the first and the second curved parts 2110 and 2120 functions to absorb load applied to the wire spring 60. Consequently, load applied to the pad 51 provided in the third PCB 50 can be reduced, and thus load directly added to the connection unit w that fixes the wire spring 60 can be reduced.

Figure 11:
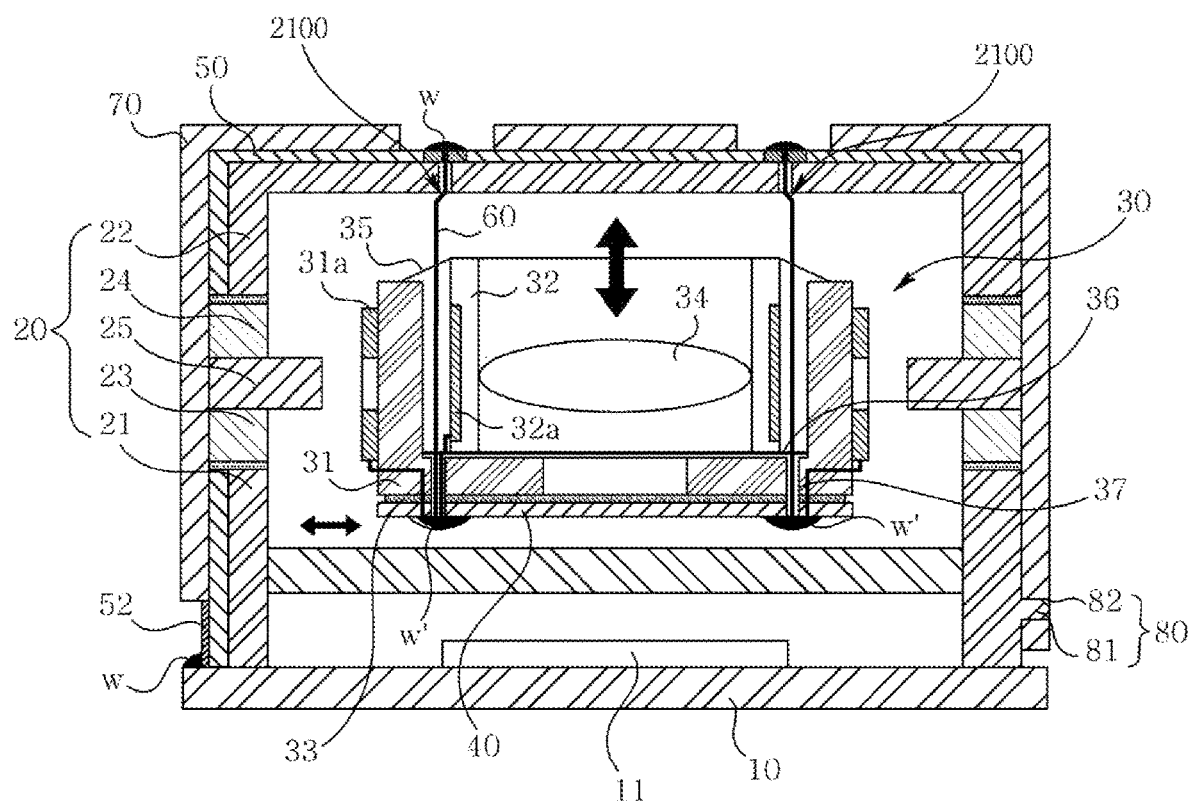
FIG. 11 is a schematic sectional view of the camera module taken along line A-A of FIG. 1 according to a fifth embodiment of the present invention.

In accordance with a fifth exemplary embodiment of the present invention, the buffering portion 2100 may be formed near the connection unit w of the wire spring 60 and the third PCB 50, as shown in FIG. 11. That is, the connection unit w of the wire spring 60 and the third PCB 50 corresponds to a position on which the load of the wire spring 60 hanging the holder module 30 is concentrated. Thus, relatively great force is applied to the connection unit w of the wire spring 60 and the third PCB 50 than to the connection unit w' connected to the second PCB 40 installed at the bottom surface of the outer blade 31. For this reason, the buffering portion 2100 may be provided at a position close to the connection unit w of the wire spring 60 and the third PCB 50.

Figure 12:
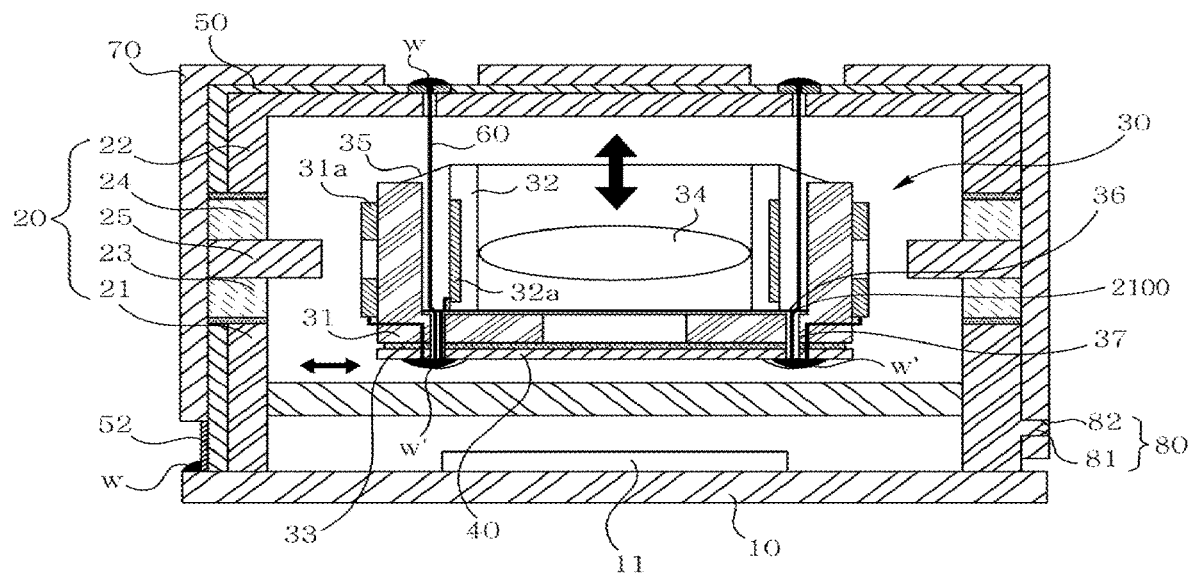
FIG. 12 is a schematic sectional view of the camera module taken along line A-A of FIG. 1 according to a sixth embodiment of the present invention.

In accordance with a sixth exemplary embodiment of the present invention, the buffering portion 2100 may be formed at a position near the connection unit w' of the wire spring 60 and the second PCB 40, as shown in FIG. 12. As described above in connection with the second embodiment, a position on which load is concentrated is the connection unit w of the wire spring 60 and the third PCB 50. Although the buffering portion 2100 is installed at a position near the connection unit w' of the wire spring 60 and the second PCB 40 on the extension line of load, however, load is absorbed at the position as in the first and the second embodiments. As a result, load applied to the connection unit w of the wire spring 60 and the third PCB 50 can be reduced.

In accordance with this construction, the buffering portion 2100 absorbs load, generated the wire spring 60 near the connection unit w of the wire spring 60 and the third PCB 50 and then pulled in the direction of gravity, or load, generated when the wire spring 60 is shaken left and right, in the form of transformation energy as shown in FIGS. 9 to 12.

It is thus possible to prevent a problem that a connection work must be performed again or a part may not be used again due to the connection units w and w' broken during an assembly process. Accordingly, a more reliable camera module may be fabricated.

In accordance with a seventh exemplary embodiment of the present invention, an impact absorption unit 3100 instead of the buffering portions 100 and 2100 may be formed in the second housing 22.

Figure 13:
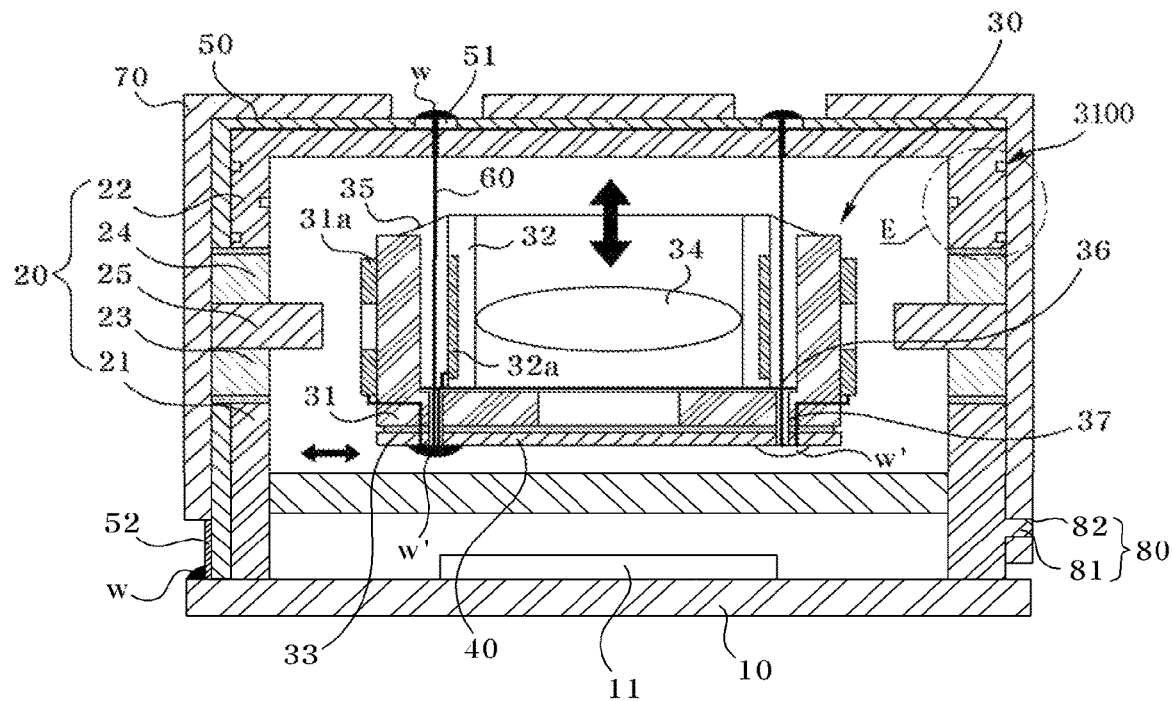
FIG. 13 is a schematic sectional view of the camera module taken along line A-A of FIG. 1 according to a seventh embodiment of the present invention.
Figure 14:
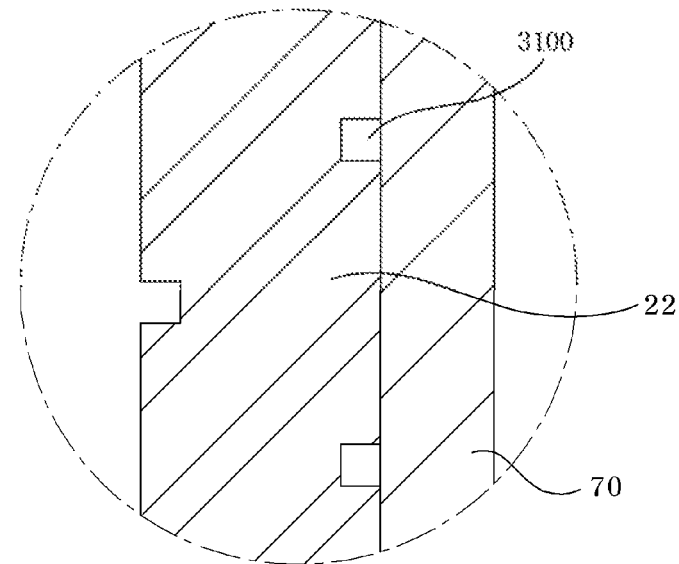
FIGS. 14 and 15 are enlarged views of a part E of FIG. 13 and are diagrams schematically illustrating the operation state of an impact absorption unit according to the seventh embodiment of the present invention.
Figure 15:
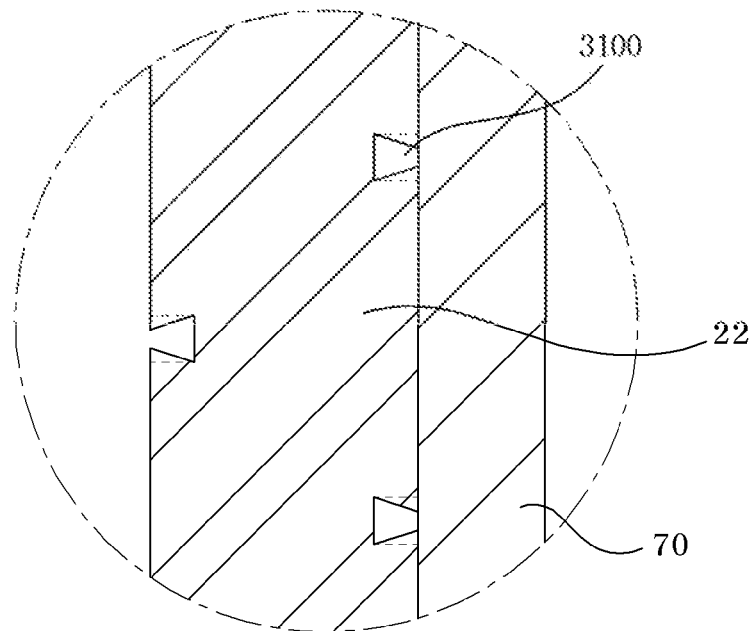

That is, the impact absorption unit 3100 may be formed in the sidewall of the second housing 22 to a specific depth and may be provided in the form of one or more grooves as shown in FIGS. 13 to 15. The impact absorption unit 3100 formed to have the groove form may have a depth smaller than the thickness of the second housing 22.

It is preferred that the impact absorption units 3100 be formed in the entire sidewall of the second housing 22 to a specific depth in the form of one or more grooves. Here, the grooves have the same depth, and they may be spaced apart from one another at specific intervals. Furthermore, the impact absorption units 3100 may be formed in the inside and outside faces of the second housing 22 in such a way as to cross each other as shown in FIGS. 13 to 15.

When the impact absorption units 3100 are formed as described above, the sidewall of the second housing 22 has a zigzag section. Thus, both the wall faces of the impact absorption unit 3100 formed to have a groove form become close to each other as shown in FIG. 6 when an external impact is applied to the second housing 22. Accordingly, the second housing 22 can be elastically deformed and thus external impact energy may be switched to the displacement energy of the second housing 22. Since the impact absorption units 3100 can absorb the external impact through the elastic deformation of the second housing 22, load due to the movement of the holder module 30 transferred to the connection units w of the wire springs 60 and the third PCB 50 can be reduced, thereby being capable of minimizing damage to the connection units w.

Likewise, the same effects may be expected if material used to form the sidewall of the second housing 22 is replaced with only elastically deformable material instead of the impact absorption units 3100. If too soft material, such as silicon or rubber, is used, however, the movement of the holder module 30 may be influenced. For this reason, the elastically deformable material needs to maintain strength having a specific level or higher.

Meanwhile, the camera module of the present invention may further include a shield can 70 configured to have through holes at respective positions corresponding to the lens module 30 around the connection units w of the third PCB 50 and the wire springs 60 and to surround the housing units 21 and 22. In this case, the third PCB 50 may be attached to the inner circumferential face of the shield can 70 as described above. Meanwhile, the shield can 70 is not indispensably necessary and may be omitted depending on the constructions of the housing units 21 and 22.

Meanwhile, as shown in FIG. 2, the camera module of the present invention may further include a hook unit 80 provided at each of the four faces or at one or more faces in order to fix the shield can 70 to the first housing 21. The position of the hook unit 80 may be within a range in which the center or corner design is allowed. The number of hook units 80 may be one or more.

The hook unit 80 may include a hook 81 protruded into the first housing 21 and a hook hole 82 formed to penetrate the shield can 70 facing the hook 81, and an opposite construction is also possible at need.

Meanwhile, the camera module of the present invention may control an Optical Image Stabilization (OIS) driver in order to reduce an impact against the internal structures of the camera module resulting from a drop.

Figure 16:
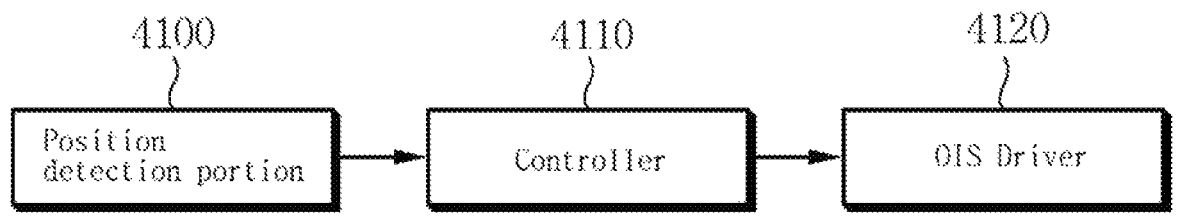
FIG. 16 is a block diagram of a camera module according to an embodiment of the present invention.

FIG. 16 is a block diagram of a camera module according to an embodiment of the present invention.

The camera module according to the embodiment of the present invention includes a position detection portion 4100 for detecting the position of the camera module, a controller 4110 for generating a control signal when the position of the camera module detected by the position detection portion 4100 corresponds to a condition that the camera module drops, and an OIS driver 4120 for reducing an impact applied to the internal structures of the camera module in response to the control signal of the controller 4110.

That is, when the camera module drops, the position detection portion 4100 detects the position of the camera module. The controller 4110 determines whether data regarding the detected position of the camera module satisfies the condition that the camera module drops.

If, as a result of the determination, the data regarding the detected position of the camera module satisfies the condition that the camera module drops, the controller 4110 outputs the control signal to the OIS driver 4120. The OIS driver 4120 reduces an impact applied to the internal structures of the camera module resulting from the drop.

The position detection portion 4100 may include at least one of a gyro sensor, an acceleration sensor, and an angular velocity sensor.

Figure 17:
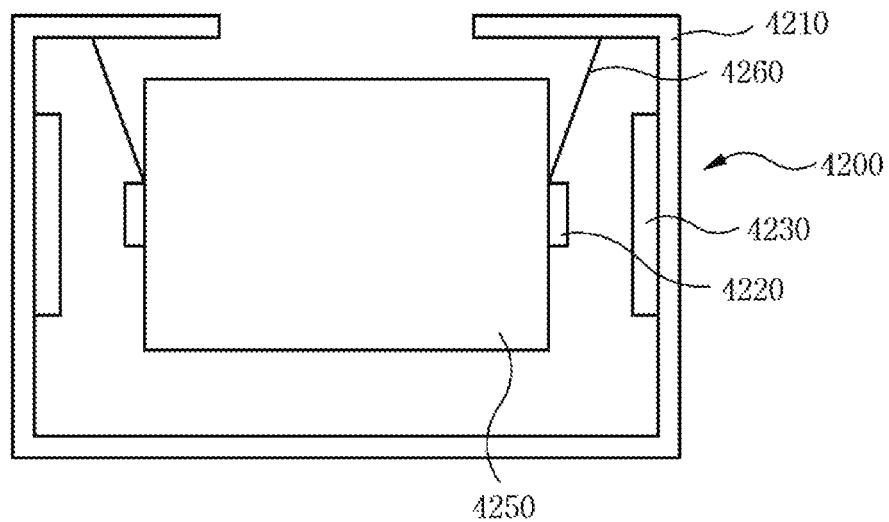
FIG. 17 is a schematic sectional view showing an example of a camera module according to an embodiment of the present invention.

FIG. 17 is a schematic sectional view showing an example of a camera module according to an embodiment of the present invention.

The camera module 4200 according to the embodiment of the present invention may be the OIS driver driven according to lens-shift or a camera module tilt method.

As shown in FIG. 17, the camera module 4200 using the lens-shift includes a lens barrel 4250 including at least one sheet of a lens and a casing 4210 having the lens barrel 4250 embedded therein.

Furthermore, the OIS driver of the camera module using the lens-shift moves the lens barrel 4250 and further includes a coil 4220 installed in the lens barrel 4250 and magnets 4230 disposed within the casing 4210.

The positions where the coil 4220 and the magnet 4230 are installed at the lens barrel 4250 and the casing 4210, respectively, may be reversed.

Furthermore, the lens barrel 4250 may be suspended from the casing 2410 through wire springs 4260.

The wire springs 4260 provide flexibility for the left and right operations of the lens barrel 4250. The wire springs 4260 are connected to the coil 4220 and configured to supply current to the coil 4220.

That is, when current is supplied to the coil 4220 through the wire springs 4260, magnetic force is generated between the coil 4220 and the magnets 4230, thus limiting the x-axis and y-axis movements of the lens barrel 4250. Accordingly, although great stress is applied to the lens barrel 4250, a buffering action for preventing the lens barrel 4250 from being broken is possible.

Figure 18:
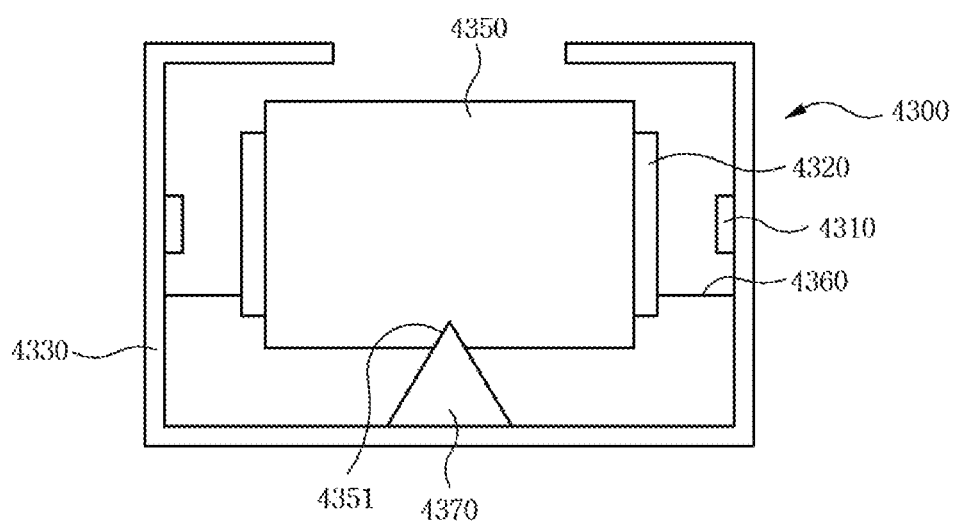
FIG. 18 is a schematic sectional view showing another example of a camera module according to an embodiment of the present invention.

FIG. 18 is a schematic sectional view showing another example of a camera module according to an embodiment of the present invention.

The camera module of FIG. 18 includes the above-described OIS driver driven according to the camera module tilt method. The camera module 4300 using the camera module tilt method includes a camera unit 4350 configured to capture an optical image of a subject and a casing 4330 configured to have the camera unit 4350 embedded therein.

The OIS driver may include magnets 4320 installed in the camera unit 4350 and coils 4310 installed within the casing 4330.

The positions where the coils 4310 and the magnets 4320 of the OIS driver are installed at the camera unit 4350 and the casing 4330, respectively, may be reversed.

Furthermore, the camera unit 4350 may be suspended from the casing 4330 through wire springs 4360, and current may be supplied to the coils 4310 through the wire springs 4360.

In the camera module 4300 using the camera module tilt method, the x-axis and y-axis movements of the camera unit 4350 are limited by magnetic force generated between the coils 4310 and the magnets 4320. Accordingly, the internal structures of the camera unit 4350 can be prevented from being broken.

In order to prevent the center of the camera unit 4350 from moving, a groove 4351 may be formed at the center of the bottom of the camera unit 4350. A pivot 4370 inserted into the groove 4351 may be formed in the casing 4330.

The groove 4351 and the pivot 4370 functions to balance the camera unit 4350 before and after Optical Image Stabilization (OIS) driving.

Furthermore, the groove 4351 may be formed at an additional support unit placed under the camera unit 4350.

Furthermore, the wire springs 4360 may function to support the camera unit 4350 to the pivot 4370.

Furthermore, when the electromagnetic action of the OIS driver disappears, the wire springs 4360 function to return the camera unit 4350 to an original position or an additional elastic unit for performing the restoration function may be further included in the camera unit 4350.

That is, the elastic unit may be connected to the lens barrel 4250 of FIG. 17 or the camera unit 4350 of FIG. 18 and the casing 4210 or 4330. The elastic unit may be formed of a member, such as a wire spring or a sheet spring having excellent force of restitution when the electromagnetic action does not exist because the supply of a power source to the coils of the OIS driver is stopped, but not limited thereto.

As described above, the camera module according to the present invention detects a drop of the camera module based on position data detected by the position detection portion and drives the OIS driver. Accordingly, an impact against the internal structures of the camera module resulting from the drop can be reduced.

The embodiments of the present invention described above and shown in the drawings should not be construed as limiting the technical spirit of the present invention. The scope of the present invention is restricted by only the claims, and a person having ordinary skill in the art to which the present invention pertains may improve and modify the technical spirit of the present invention in various forms. Accordingly, the modifications and modifications will fall within the scope of the present invention as long as they are evident to those skilled in the art.

What is claimed is:

1. A camera module, comprising:
    a first Printed Circuit Board (PCB);
    an image sensor disposed on the first PCB;
    a base disposed on the first PCB;
    a holder module disposed on the base, wherein the holder module comprises:
        an outer blade;
        a bobbin disposed in the outer blade; and
        a spring member connecting the bobbin and the outer blade,
    a lens coupled with the bobbin;
    a first coil disposed on the bobbin;
    a magnet configured to move the bobbin by interacting with the first coil;
    a second coil configured to move the holder module by interacting with the magnet;
    a second Printed Circuit Board (PCB) comprising a plurality of terminals;
    a wire coupled with the holder module; and
    a buffer unit comprising a bent or curved portion,
    wherein the buffer unit is connected to the wire,
    wherein the wire comprises a plurality of wires,
    wherein the plurality of terminals of the second PCB comprises two terminals,
    wherein the two terminals are electrically connected to the first coil through two wires of the plurality of wires, respectively, and
    wherein a current supplied from the two terminals is supplied to the first coil through the buffer unit.

2. The camera module of claim 1, wherein the buffer unit comprises two buffer units connected to the two wires, respectively, and
    wherein the two buffer units are electrically connected to the first coil.

3. The camera module of claim 1, wherein the plurality of terminals of the second PCB are coupled with the first PCB by the soldering, and
    wherein the current supplied from the two terminals is supplied to the first coil through the wire and the spring member.

4. The camera module of claim 1, wherein the buffer unit is configured to movably support the holder module.

5. The camera module of claim 1, further comprising a first solder part and a second solder part,
    wherein the second PCB comprises a first part disposed on the base and a second part extending from the first part to the first PCB,
    wherein the wire is coupled with the first part of the second PCB,
    wherein the plurality of terminals of the second PCB are disposed on a lower portion of the second part of the second PCB, and
    wherein the first solder part connects one distal end portion of the wire to the first part of the second PCB and the second solder part connects the other end portion of the wire to the holder module.

6. The camera module of claim 5, wherein the second PCB comprises a pad formed on the first part of the PCB and comprising a hole,
    wherein the pad comprises a first surface facing the holder module and a second surface opposite to the first surface, and
    wherein the wire passes through the hole of the pad and is coupled to the second surface of the pad.

7. The camera module of claim 5, wherein the second part of the second PCB is disposed along an outer lateral surface of the base, and
    wherein the plurality of terminals of the second PCB comprises four terminals for optical image stabilization (OIS).

8. The camera module of claim 1, further comprising at least one of a gyro sensor, an acceleration sensor and an angular velocity sensor,
    wherein the second coil comprises four coils,
    wherein the magnet comprises four magnets, and
    wherein the wire is formed with a metal material and with a thickness of 1~100 μm.

9. The camera module of claim 1, wherein the buffer unit is disposed nearer to the outer blade than the base.

10. The camera module of claim 1, further comprising a filter member coupled to the base, and
    wherein the buffer unit is connected to the wire in a longitudinal direction of the wire.

11. The camera module of claim 1, wherein the buffer unit is integrally formed with the wire.

12. A camera module, comprising:
    a first Printed Circuit Board (PCB);
    an image sensor disposed on the first PCB;
    a base disposed on the first PCB;
    a holder module disposed on the base, wherein the holder module comprises:
        an outer blade;
        a bobbin disposed in the outer blade; and
        a spring member connecting the bobbin and the outer blade, a lens coupled with the bobbin;
a first coil disposed on the bobbin;
a magnet facing the first coil;
a second coil facing the magnet;
a second Printed Circuit Board (PCB) comprising a terminal;
a wire coupled with the holder module; and
a buffer unit comprising a bent or curved portion,
wherein the buffer unit is connected to the wire,
wherein the wire comprises a plurality of wires,
wherein the plurality of wires comprises two wires electrically connected to the first coil,
wherein the buffer unit comprises two buffer units connected to the two wires, respectively, and
wherein a current supplied from the terminal is supplied to the first coil through the two buffer units.

13. The camera module of claim 12, wherein the second PCB comprises a first part disposed on the base and a second part extending from the first part to the first PCB,
wherein the terminal of the second PCB is disposed on a lower portion of the second part of the PCB,
wherein the terminal of the second PCB comprises two terminals for focusing,
wherein the buffer unit is configured to movably support the holder module, and
wherein the current supplied from the terminal is supplied to the first coil through the wire and the spring member.

14. An optical image stabilization (OIS) unit, comprising:
a base;
a holder module spaced apart from the base, wherein the holder module comprises:
an outer blade;
a bobbin disposed in the outer blade; and
a spring member connecting the bobbin and the outer blade,
a first coil disposed on the bobbin;
a magnet facing the first coil;
a second coil facing the magnet;
a Printed Circuit Board (PCB) comprising a terminal;
a wire coupled with the holder module; and
a buffer unit comprising a bent or curved portion,
wherein the buffer unit is connected to the wire,
wherein the wire comprises a plurality of wires,
wherein the terminal is electrically connected to the first coil through two wires of the plurality of wires,
wherein the buffer unit comprises two buffer units connected to the two wires, respectively, and
wherein a current supplied from the terminal is supplied to the first coil through the two buffer units.

15. The OIS unit of claim 14, wherein the PCB comprises a first part disposed on the base and a second part downwardly extending from the first part,
wherein the wire is coupled with the first part of the PCB,
wherein the terminal of the PCB comprises two terminals disposed on a lower portion of the second part of the PCB, and
wherein the current supplied from the terminal is supplied to the first coil through the wire and the spring member.

16. An optical image stabilization (OIS) unit, comprising:
a base;
a holder module comprising an outer blade spaced apart from the base, a bobbin disposed in the outer blade, and a spring member coupled to the outer blade;
a first coil disposed on the bobbin;
a magnet configured to move the bobbin by interacting with the first coil;
a second coil configured to move the holder module by interacting with the magnet;
a wire that supports a movement of the holder module and electrically connected to the first coil through the spring member;
a buffer unit comprising a curved or bent portion and disposed near to a connection portion connecting the wire to one of the holder module and the base; and
a Printed Circuit Board (PCB) comprising a terminal,
wherein a current supplied from the terminal is supplied to the first coil through the buffer portion.

17. The OIS unit of claim 16, wherein the buffer unit is configured to absorb load applied to the wire.

18. The OIS unit of claim 16, wherein the buffer unit is configured to inhibit the wire from being damaged.

19. A camera module, comprising:
a housing unit comprising a base;
a holder module disposed on the base, wherein the holder module comprises:
an outer blade;
a bobbin disposed in the outer blade; and
a spring member connecting the bobbin to the outer blade;
a first coil wound on the bobbin;
a magnet configured to move the bobbin by interacting with the first coil;
a second coil configured to move the holder module by interacting with the magnet;
a wire configured to support a movement of the holder module;
a buffer unit comprising a bent or curved portion; and
a Printed Circuit Board (PCB) comprising a terminal,
wherein the buffer unit is connected to the wire, and
wherein a current supplied from the terminal is supplied to the first coil through the buffer unit.

20. The camera module of claim 19, wherein the buffer unit is configured to movably support the holder module, and
wherein a distance between both ends of the buffer unit is configured to be increased or decreased such that the buffer unit absorbs load applied to the camera module.

21. The camera module of claim 19, wherein a shape of the buffer unit is configured to be changed when a shock is applied to the camera module such that the holder module is movable,
wherein the terminal of the PCB comprises two terminals for auto focusing control and four terminals for OIS control, and
wherein the wire is electrically connected to the first coil through the spring member.

22. An optical image stabilization (OIS) unit, comprising:
a first Printed Circuit Board (PCB) comprising a terminal;
a wire connected with the first PCB;
a housing unit comprising a base and connected with the first PCB;
a holder module disposed on the base, the holder module comprising:
an outer blade spaced apart from the housing unit;
a bobbin disposed in the outer blade; and
a spring member connecting the bobbin to the outer blade;
a first coil wound on the bobbin; and
a buffer unit comprising a bent or curved portion,
wherein the buffer unit is connected to the wire, and
wherein a current supplied from the terminal is supplied to the first coil through the buffer unit.

23. The OIS unit of claim 22, further comprising a magnet configured to move the bobbin by interacting with the first coil, a second coil configured to move the holder module by interacting with the magnet, and a solder unit comprising a first solder part connecting the wire and the first PCB and a second solder part connecting the wire and the holder module,
- wherein the first PCB comprises a first portion that extends on the base, and a second portion bent to extend downwardly,
- wherein the first portion of the first PCB is disposed between the first solder part and the second solder part, and
- wherein the wire and the spring member are electrically connected through the second solder part.

24. The OIS unit of claim 23, wherein the first portion of the first PCB comprises a pad formed with a hole,
- wherein the wire passes through the hole of the pad,
- wherein the wire comprises six wires, and
- wherein the wire is soldered to the pad and the first solder part is disposed on the pad.

25. A camera module comprising the OIS unit of claim 22 and a second PCB disposed under the base.

\* \* \* \* \*